(12) United States Patent
Taborn

(10) Patent No.: US 10,085,134 B2
(45) Date of Patent: Sep. 25, 2018

(54) TECHNOLOGIES FOR REMOTE MANAGEMENT OF PATIENT HEALTHCARE

(71) Applicant: Intel Corporation, Santa Clara, CA (US)

(72) Inventor: Michael P. Taborn, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 15/086,256

(22) Filed: Mar. 31, 2016

(65) Prior Publication Data

US 2017/0134884 A1 May 11, 2017

Related U.S. Application Data

(60) Provisional application No. 62/252,210, filed on Nov. 6, 2015.

(51) Int. Cl.

| H04B 5/00 | (2006.01) |
|---|---|
| H04W 4/80 | (2018.01) |
| H04W 4/00 | (2018.01) |
| H04W 76/02 | (2009.01) |
| H04W 76/14 | (2018.01) |
| H04W 4/70 | (2018.01) |

(52) U.S. Cl.
CPC ............ *H04W 4/80* (2018.02); *H04B 5/0031* (2013.01); *H04W 4/005* (2013.01); *H04W 4/008* (2013.01); *H04W 4/70* (2018.02); *H04W 76/023* (2013.01); *H04W 76/14* (2018.02)

(58) Field of Classification Search
None
See application file for complete search history.

(56) References Cited

U.S. PATENT DOCUMENTS

| 2011/0021140 | A1* | 1/2011 | Binier | H04B 5/0043 455/41.1 |
|---|---|---|---|---|
| 2012/0003933 | A1* | 1/2012 | Baker | H04W 76/38 455/41.2 |
| 2014/0080413 | A1* | 3/2014 | Hayes | H04B 5/0037 455/41.1 |
| 2014/0316792 | A1* | 10/2014 | Siddiqui | G06F 19/3418 705/2 |
| 2015/0324528 | A1* | 11/2015 | Chang | H04W 4/008 705/3 |

* cited by examiner

*Primary Examiner* — David Bilodeau
(74) *Attorney, Agent, or Firm* — Barnes & Thornburg LLP

(57) ABSTRACT

Technologies for management of patient healthcare include a gateway device to read near field communication data from a near field communication device, determine a user associated with the near field communication device based on the near field communication data, receive sensor data from one or more sensors communicatively coupled to the gateway device and associated with a patient in response to a determination that the user is the patient, and store the received sensor data to a data storage of the gateway device.

23 Claims, 5 Drawing Sheets

TECHNOLOGIES FOR REMOTE MANAGEMENT OF PATIENT HEALTHCARE

CROSS-REFERENCE TO RELATED U.S. PATENT APPLICATION

The present application claims priority under 35 U.S.C. § 119(e) to U.S. Provisional Application Ser. No. 62/252,210, entitled "Technologies for Application Program Interface (API) Provisioning and Modification," which was filed on Nov. 6, 2015.

BACKGROUND

Some computing systems allow for the remote management of connected computing devices. For example, an enterprise-based security manager may be utilized for the authentication and attestation of computing devices in an enterprise environment and/or to perform other remote management functions. Further, in some embodiments, a gateway device (e.g., an IoT gateway) may be employed in a computing environment to allow a collection of devices (e.g., legacy industrial devices) to communicate with a network infrastructure and/or cloud computing environment.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
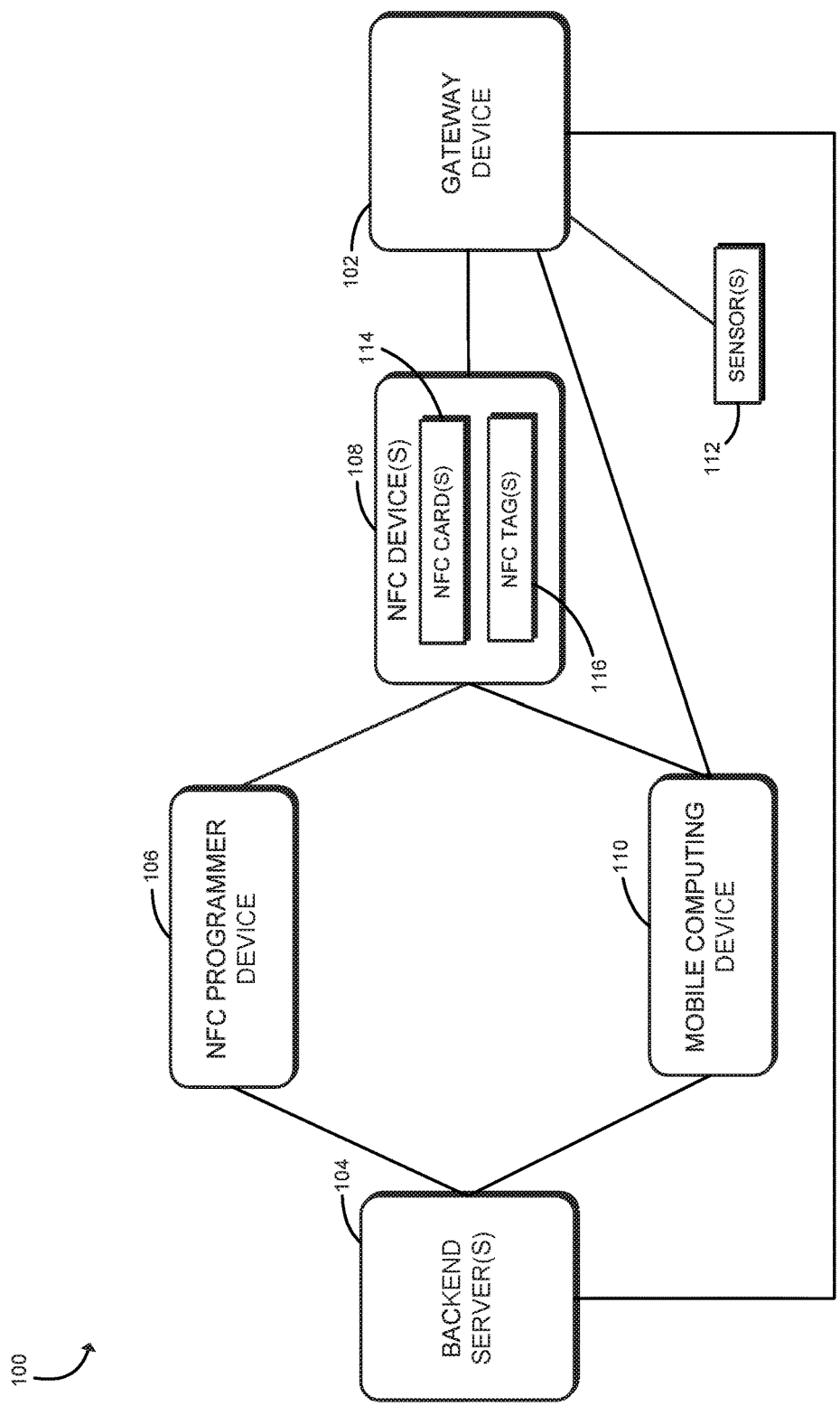
FIG. 1 is a simplified block diagram of at least one embodiment of a system for management of patient healthcare.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for management of patient healthcare includes a gateway device 102, one or more backend servers 104, a near field communication (NFC) programmer device 106, one or more NFC devices 108, a mobile computing device 110, and one or more sensors 112. Although only one gateway device 102, one NFC programmer device 106, and one mobile computing device 110 are illustratively shown in FIG. 1, the system 100 may include any number of gateway devices 102, NFC programmer devices 106, and/or mobile computing devices 110 in other embodiments.

It should be appreciated that, in some embodiments, the system 100 enables healthcare providers to remotely manage patient-side (e.g., client-side) devices based on factors including NFC and/or location. In some embodiments, the provisioning, configuration, and/or modification of APIs and validation actions may be executed accurately, securely, and uniquely by taking into account device/patient location and/or NFC data. For example, unique combinations of location, time/date, and NFC identifier (ID) inputs may cause the gateway device 102 to operate as different "state machines" for the patient, caregiver, technician, and/or other entities. As such, the gateway device 102 may operate and/or respond differently (or uniquely) to a patient, caregiver, or technician based on the particular contextual data received regarding location, device MAC address, time/date, NFC inputs, and/or other contextual data. The system 100 may utilize a combination of unique data elements to enable state machines, manage provisioning and API updates, and/or create custom interfaces for patients, caregivers, technicians, and/or other entities (e.g., via remote management and local use). Accordingly, each user group (e.g., patient, caregiver, technician, etc.) may be presented with the functionality that they need due to the combination of unique data elements causing the device to operate as the appropriate state machine (e.g., with different user interfaces and/or different levels of system access depending on the data elements at the time of device operation).

Depending on the particular embodiment, one or more near field communication (NFC) functions may be employed by the various components of the system 100. For example, in some embodiments, one or more devices of the system 100 may identify a device user, write data to an NFC device 108 with values for diagnostic purposes to carry back, download applications, pair and authenticate devices, determine which preloaded configurations are used by the gateway device 102, determine which server (e.g., which backend server 104) is used for applications, determine which server (e.g., which backend server 104) is used for attestation, determine which server (e.g., which backend server 104) is used for data, force the allowance of an administrator role, clear/delete data from a device in an administrator role, provide a tablet computer with the ability to modify WiFi, provide a tablet computer with the ability to modify an IP address, provide a tablet computer with the ability to modify and repair components, download configurations directly from an NFC device 108 (e.g., an NFC card 114), attest info, and/or perform other NFC functions.

In some embodiments, the gateway device 102 may utilize the NFC data to determine which backend servers 104 and/or other devices with which to connect and may utilize the NFC data for security and/or integrity checks. As described herein, the combination of NFC and the gateway device 102 may cause the device to operate differently depending on what NFC data is read, where the device is located, the time of day, and/or other contextual information. For example, in some embodiments, the gateway device 102 may employ location aware attestation based on the NFC data such that the gateway device 102 may be inaccessible, placed in a low-power state, or otherwise prevented from fully functioning in a location that is unauthorized by the NFC data of the backend server 104. In such embodiments, it should be appreciated that the gateway device 102 may include one or more types of location-detecting sensors/circuitry (e.g., GPS/GNSS) and/or be otherwise capable of determining the location of the gateway device 102 (e.g., via communication tower triangulation). In some embodiments, administrators may have NFC cards 114 that allow them to perform system configuration, management, repair, and/or other administrative functions, whereas patients may have NFC cards 114 that allow for the collection, storage, and transmission of sensor data. In some embodiments, time and date information may be combined with NFC and location data to enforce activity sequencing (e.g., when such a feature is required or beneficial).

As described herein, it should be appreciated that in an environment in which a single gateway device 102 is shared by multiple users, the combination of unique data elements may allow the gateway device 102 to collect and transmit data from multiple patients, store/encrypt/transmit each data set, and permit the backend server(s) 104 to validate each data set appropriately. As such, a single gateway device 102 may deliver custom/unique GUIs, state machines, sensor associations, and operation sequencing to multiple patients and caregivers (e.g., by virtue of the combination of unique data elements allowing the backend to validate the data set each time data is collected and transmitted). Although the techniques described herein are primarily described in reference to the healthcare field, it should be further appreciated that, in other embodiments, the techniques may be employed in relation to another field (e.g., industrial, critical device management, military/intelligence, financial, and/or other fields where access is to change based on a current user and/or location).

Figure 2:
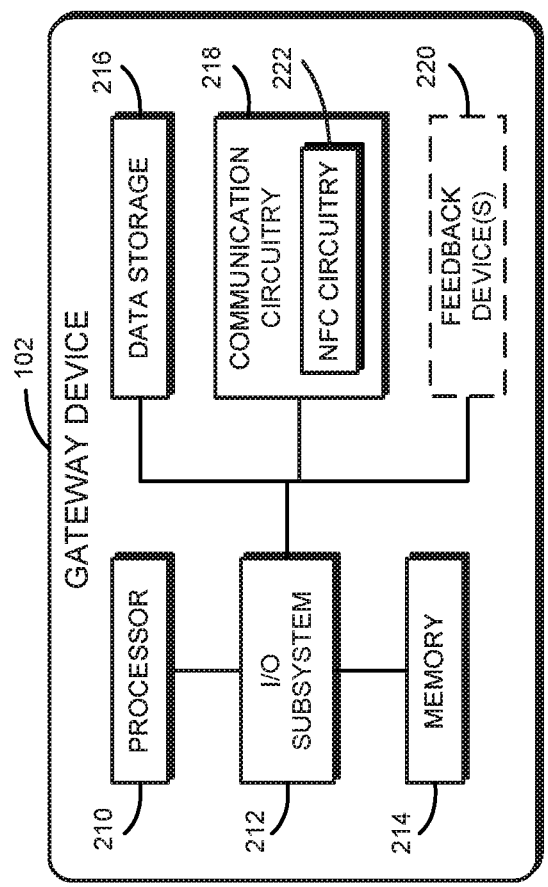
FIG. 2 is another simplified block diagram of at least one embodiment of a gateway device of the system of FIG. 1.

Referring now to FIG. 2, the gateway device 102 may be embodied as any one or more computing devices configured to perform the functions described herein. For example, in some embodiments, the gateway device 102 may be embodied as an Intel® IoT gateway device. In other embodiments, the gateway device 102 may be embodied as an IoT device, gateway device, laptop computer, tablet computer, notebook, netbook, Ultrabook™, a smartphone, cellular phone, wearable computing device, personal digital assistant, mobile Internet device, desktop computer, workstation, server, and/or any other computing/communication device. As shown in FIG. 2, the illustrative gateway device 102 includes a processor 210, an input/output ("I/O") subsystem 212, a memory 214, a data storage 216, and a communication circuitry 218. Additionally, in some embodiments, the gateway device 102 may include one or more feedback devices 220. Of course, the gateway device 102 may include other or additional components, such as those commonly found in a typical computing device (e.g., various input/output devices, peripheral devices, and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the gateway device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the gateway device 102. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the gateway device 102, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the gateway device 102 as described herein.

The communication circuitry 218 may be embodied as any communication circuit, device, or collection thereof, capable of enabling communications between the gateway device 102 and other remote devices over a network (not shown). The communication circuitry 218 may be configured to use any one or more communication technologies (e.g., wireless or wired communications) and associated protocols (e.g., Ethernet, Bluetooth®, Wi-Fi®, WiMAX, LTE, 5G, etc.) to effect such communication. As shown in FIG. 2, the communication circuitry 218 may include an NFC circuitry 222, which may be embodied as any circuitry suitable for near field communication. For example, in some embodiments, the NFC circuitry 222 may be utilized for the gateway device 102 to communicate with the NFC devices 108 such as NFC cards 114 (e.g., key fobs or key cards) and/or NFC tags 116 (e.g., paper RFID tags).

Depending on the particular embodiment, each of the feedback devices 220 may be embodied as any type of device or component configured to provide feedback to the patient, caregiver, and/or other user of the gateway device 102. For example, in some embodiments, the feedback device 220 may be configured to provide a beep or other audio feedback to indicate, for example, a successful pairing of the gateway device 102 with a sensor. Depending on the particular embodiment, the feedback devices 220 may provide audial, visual, tactile, and/or other feedback to the user of the gateway device 102.

Returning to FIG. 1, each of the backend servers 104, the NFC programmer device 106, and/or the mobile computing device 110, may be embodied as any type of computing device capable of performing the functions described herein (e.g., a server, desktop computer, workstation, laptop computer, tablet computer, notebook, netbook, Ultrabook™, a smartphone, cellular phone, wearable computing device, personal digital assistant, mobile Internet device, and/or any other computing/communication device). In some embodiments, one or more of the backend servers 104, the NFC programmer device 106, and/or the mobile computing device 110 may include components similar to those of the gateway device 102 described above, descriptions of which are not repeated herein for clarity of the description. Further, it should be appreciated that one or more of the backend servers 104, the NFC programmer device 106, and/or the mobile computing device 110 may include other components, sub-components, and devices commonly found in a computing device, which are not discussed above in reference to the gateway device 102 and not discussed herein for clarity of the description. In some embodiments, one or more of the components of the gateway device 102 may be omitted from any of the devices 104, 106, 110 (e.g., the feedback devices 220).

As shown in FIG. 1, the NFC devices 108 may include, for example, NFC cards 114 (e.g., key cards/fobs able to communicate over NFC links) and/or NFC tags 116 (e.g., paper-based RFID tags) depending on the particular embodiment. For example, in some implementations of the techniques described herein, a medical facility may include an NFC tag 116 on a patient's discharge papers, which may be subsequently scanned by a gateway device 102. Further, a caregiver of the patient may be assigned an NFC card 114 that, when in close proximity to the gateway device 102, may communicate with the gateway device 102, for example, to retrieve sensor data regarding the patient collected by sensors communicatively coupled to the gateway device 102, upload and/or reconfigure various interfaces or parameters to the gateway device 102, modify the modify the backend server(s) 104 used by the gateway device 102 for attestation and/or data transmission, and/or perform various administrative functions on behalf of the gateway device 102. As such, in the illustrative embodiment, it is unnecessary to pre-program or pre-associate the gateway device 102 with a particular patient and/or sensors associated with that patient's remote healthcare needs.

It should be appreciated that, in various embodiments, the NFC programmer device 106, the mobile computing device 110 (e.g., via an Android or other smartphone application), and/or other suitable devices may be used to program the NFC devices 108. For example, in some embodiments, the NFC programmer device 106 may be used by a healthcare professional during discharge of a patient to write NFC data to an NFC tag 116 or NFC card 114 provided to the patient at discharge as described herein. Further, in some embodiments, the healthcare professional may utilize the NFC programmer device 106 to periodically update an NFC card 114 assigned to a patient during recurring visits with that patient.

In some embodiments, it should be appreciated that the mobile computing device 110 may communicate directly with the gateway device 102 (e.g., via an NFC communication network or a short-range communication network) to perform one or more of the functions of an NFC device 108 described herein. For example, in some embodiments, a caregiver may utilize a tablet computer to connect to the gateway device 102, retrieve sensor data from the gateway device 102, and/or update/reconfiguration various features/data of the gateway device 102 as described herein. In some embodiments, the gateway device 102 may rely on the near proximity of the mobile computing device 110 sensed by virtue of NFC circuitry and/or attestation measures in confirming that the mobile computing device 110 is secure for communication with the gateway device 102. Of course, in some embodiments, the user of the mobile computing device 110 may be required to enter a password or utilize/pass other authentication mechanisms before access to the gateway device 102 is permitted.

Each of the sensors 112 may be embodied as any sensor configured to generate data/signals indicative of a characteristic of the patient, an environment of the gateway device 102 or computing device that includes the sensor 112 (e.g., physical environment, networking environment, hardware/software environment, social environment, etc.), and/or other suitable contextual information. In some embodiments, the sensors 112 may be embodied as or form a portion of, for example, a blood pressure cuff, glucometer, pulse oximeter, weight scale, and/or other sensors capable of measuring physiological characteristics of a patient. In other embodiments, the sensors 112 may be embodied as, or otherwise include, for example, inertial sensors, position sensors, location sensors, proximity sensors, optical sensors, light sensors, audio sensors, temperature sensors, motion sensors, piezoelectric sensors, cameras, communication sensors, and/or other types of sensors. Of course, in some embodiments, the gateway device 102 and/or other components of the system 100 may include devices configured to facilitate the use of the sensor(s) 112. Depending on the particular embodiment, the sensors 112 may include hardware sensors and/or software sensors (e.g., software sensors to identify software applications executed at a particular point in time).

Figure 3:
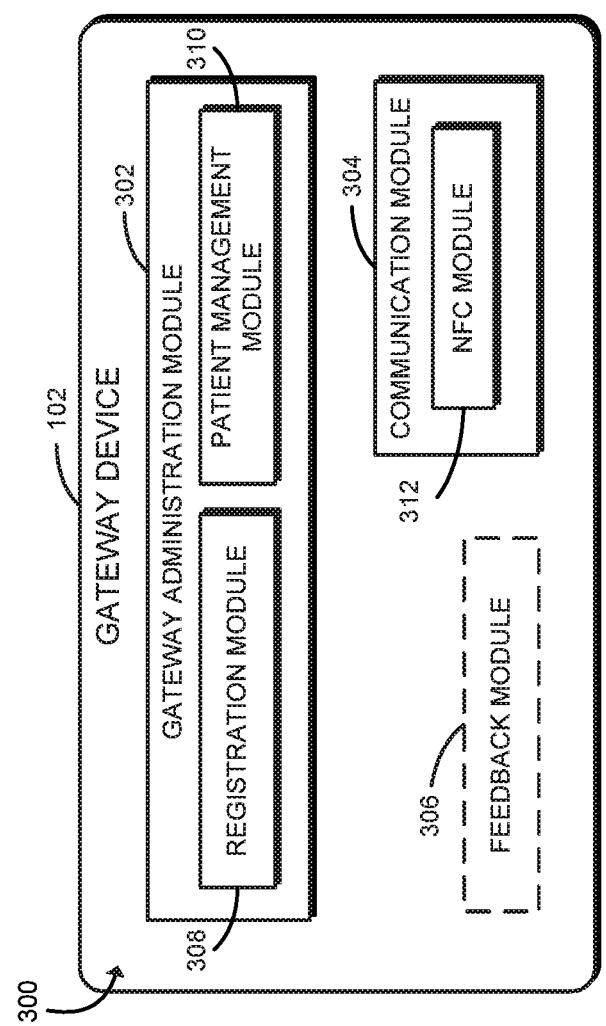
FIG. 3 is a simplified block diagram of at least one embodiment of an environment of the gateway device of FIG. 2.

Referring now to FIG. 3, in use, the gateway device 102 establishes an environment 300 for management of patient healthcare. The illustrative environment 300 includes a gateway administration module 302 and a communication module 304. Additionally, in some embodiments, the environment 300 may include a feedback module 306. As shown, the illustrative gateway administration module 302 includes a registration module 308 and a patient management module 310 and the illustrative communication module 304 includes an NFC module 312. The various modules of the environment 300 may be embodied as hardware, software, firmware, or a combination thereof. For example, the various modules, logic, and other components of the environment 300 may form a portion of, or otherwise be established by, the processor 210 or other hardware components of the gateway device 102. As such, in some embodiments, one or more of the modules of the environment 300 may be embodied as circuitry or collection of electrical devices (e.g., a gateway administration circuitry, a communication circuitry, a feedback circuitry, a registration circuitry, a patient management circuitry, and/or an NFC circuitry). Additionally, in some embodiments, one or more of the illustrative modules may form a portion of another module and/or one or more of the illustrative modules may be independent of one another. For example, in some embodiments, the registration module 308 and/or the patient management module 310 may be separate from the gateway administration module 302. Further, in some embodiments, the NFC module 312 may be separate from the communication module 304.

The gateway administration module 302 is configured to perform various registration, device pairing, API updates, and/or other administrative functions on behalf of the gateway device 102. As described above, in the illustrative embodiment, the gateway administration module 302 includes the registration module 308 and the patient management module 310. The registration module 308 is configured to permit the registration of a patient to the gateway device 102. For example, in some circumstances, the gateway device 102 may be shipped to or received by a particular patient without having previously been preconfigured specifically for the patient and/or without having been previously paired with the sensors 112 relevant to the patient's healthcare. In such embodiments, the gateway device 102 may scan or otherwise communicate with the NFC device 108 of the patient to receive NFC data that identifies the patient, the sensors 112 associated with the patient's remote healthcare plan, the backend server(s) 104 to which the gateway device 102 is to transmit sensor data regarding the patient's physiological characteristics and/or other contextual data, an API with which mobile computing devices 110 may interact with the gateway device 102, secure communication protocols, cryptographic keys, device attestation data, and/or other gateway configuration data suitable for performing the functions described herein. Based on the NFC data, the registration module 308 may communicate with the identified sensors 112 associated with the patient, for example, over a short-range communication network (e.g., via Bluetooth®, ZigBee®, 6LoWPAN, Wi-Fi, or another suitable communication network) to pair the sensors 112 with the gateway device 102. As described herein, in some embodiments, the gateway device 102 and/or sensors 112 may be utilized by multiple patients. As such, the registration module 308 may store the relevant patient/sensor associations for subsequent use.

The patient management module 310 is configured to perform various functions related to the remote healthcare management of one or more patients. For example, as described below, the patient management module 310 may determine a user group (e.g., patient, healthcare provider, caregiver, etc.) and/or particular user based on NFC data read from an NFC device 108. In some embodiments, in response to the gateway device 102 sensing/reading NFC data associated with a patient, the patient management module 310 receives sensor data from the sensors paired with the gateway device 102 and associated with that patient for storage/transmission (e.g., to the backend server 104). In response to the gateway device 102 sensing/reading NFC data associated with a caregiver, the patient management module 310 may transmit stored sensor data associated with a patient to the caregiver device (e.g., via an NFC or short-range communication network and/or reconfigure the gateway device 102 based on instructions received from the caregiver device as described herein.

The communication module 304 handles the communication between the gateway device 102 and other computing devices of the system 100 (e.g., the backend server(s) 104). It should be appreciated that the communication module 304 may utilize any suitable algorithm or protocol for such communication. Further, in the illustrative embodiment, the communication module 304 includes the NFC module 312, which enables the gateway device 102 to utilize near field communication with other NFC-capable devices (e.g., the NFC devices 108). Of course, it should be appreciated that, in some embodiments, the NFC module 312 may be separate from the communication module 304.

The feedback module 306 is configured to generate feedback to a user of the gateway device 102. For example, in some embodiments, the feedback module 306 may generate feedback indicative of a successful pairing of the gateway device 102 with a sensor 112 during the patient/sensor registration process described herein. In some embodiments, the feedback module 306 may generate, for example, audial (e.g., a beep), visual (e.g., a flash), tactile (e.g., vibration), and/or other suitable feedback.

Figure 4:
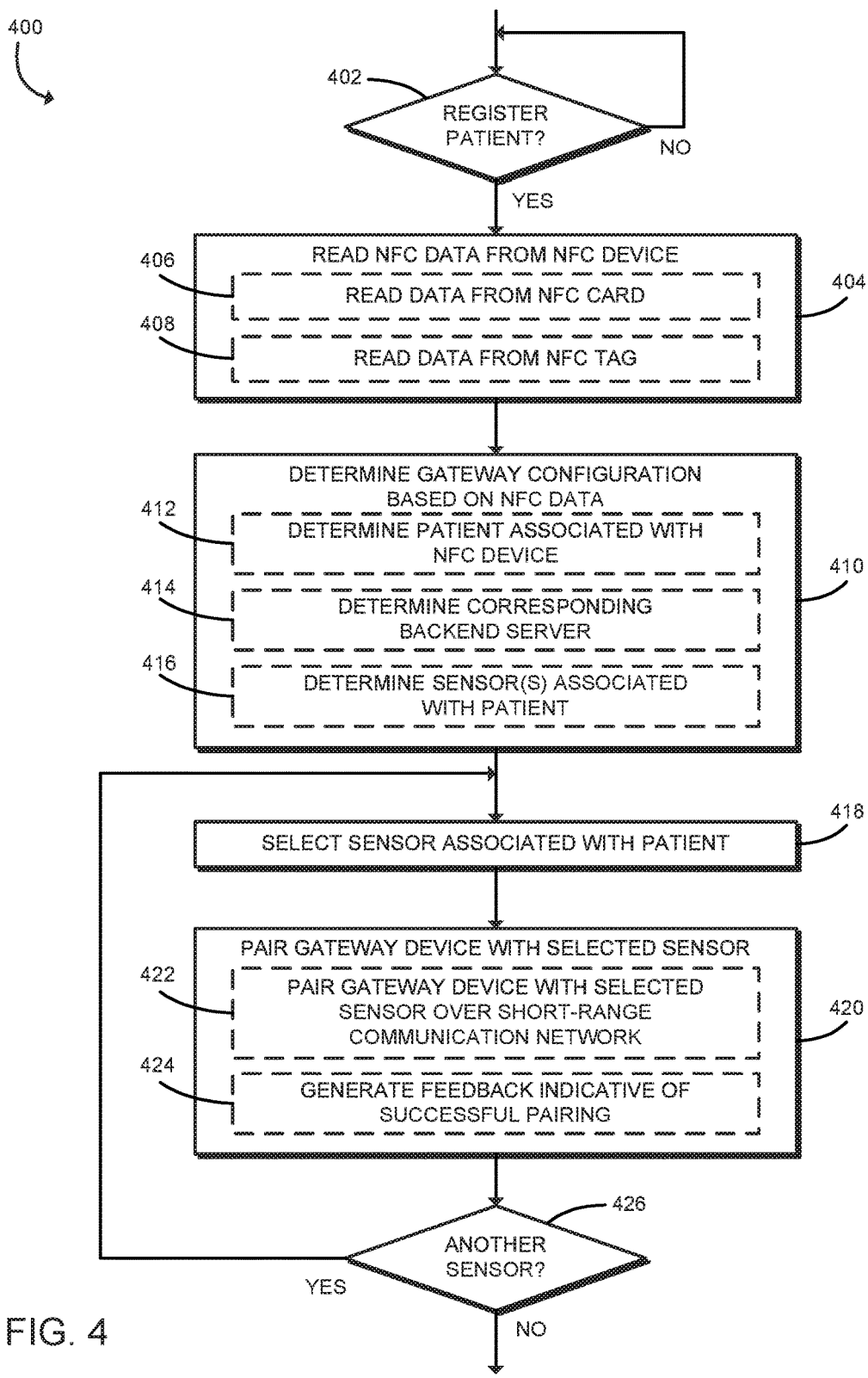
FIG. 4 is a simplified flow diagram of at least one embodiment of a method for registering a patient to the gateway device of FIG. 2.

Referring now to FIG. 4, in use, the gateway device 102 may execute a method 400 for registering a patient to the gateway device 102. It should be appreciated that, in some embodiments, the techniques of the method 400 may be executed by one or more of the modules of the environment 300 of the gateway device 102 as shown in FIG. 3. As described above, in some embodiments, a patient may be discharged from a hospital with or otherwise provided an NFC card 114 and/or NFC tag 116, and a generic gateway device 102 may be provided to or separately shipped (e.g., by a third party) to the patient. The illustrative method 400 begins with block 402 in which the gateway device 102 determines whether to register a patient. For example, as described herein, in some embodiments, the gateway device 102 may determine to register a patient if an NFC device 108 is read or scanned by the gateway device 102 (e.g., due to proximity to the gateway device 102) that had previously never been read or scanned. Of course, the gateway device 102 may otherwise determine that a patient is to be registered to the gateway device 102 in other embodiments. For example, in some embodiments, the user may press a button on the gateway device 102 prior to scanning an NFC device 108 with the gateway device 102 to indicate that the scanned NFC device 108 is associated with patient registration.

If the gateway device 102 determines to register a patient, the gateway device 102 reads NFC data from the NFC device 108 in block 404. For example, the gateway device 102 may read NFC data from an NFC card 114 in block 406 or from an NFC tag 116 in block 408. As described above, the NFC data may identify the corresponding patient, the sensors 112 associated with the patient's remote healthcare plan, the backend server(s) 104 to which the gateway device 102 is to transmit sensor data regarding the patient's physiological characteristics and/or other contextual data, an API with which mobile computing devices 110 may interact with the gateway device 102, secure communication protocols, cryptographic keys, device attestation data, and/or other gateway configuration data suitable for performing various functions described herein.

As such, in block 410, the gateway device 102 determines the relevant gateway configuration data based on the read NFC data. In doing so, in block 412, the gateway device 102 may determine the patient associated with the NFC device 108. In block 414, the gateway device 102 may determine a backend server 104 corresponding with the NFC device 108 (e.g., a backend server 104 to which to transmit patient sensor data and/or from which to receive API data). In block 416, the gateway device 102 may determine the one or more sensors 112 associated with the patient. For example, in some embodiments, a particular patient's remote healthcare plan may require monitoring of the patient's glucose level and blood pressure; in such embodiments, the NFC data may identify a glucometer and blood pressure cuff as relevant sensors 112 associated with that patient.

In block 418, the gateway device 102 selects a sensor 112 associated with the patient and, in block 420, the gateway device 102 pairs the gateway device 102 with the selected sensor 112. In particular, in block 422, the gateway device 102 may be paired with the selected sensor 112 over a short-range communication network. For example, the gateway device 102 and the sensor 112 may be paired over a Bluetooth® communication network or other suitable communication network. In block 424, the gateway device 102 may generate feedback (e.g., a beep) indicative of a successful pairing with the selected sensor 112 as described above. In block 426, the gateway device 102 determines whether to pair the gateway device 102 with another sensor 112 (e.g., whether there are any further sensors 112 associated with the patient to be paired). If so, the method 400 returns to block 418 in which the gateway device 102 selects another sensor associated with the patient. In other words, the gateway device 102 is paired with all of the sensors 112 associated with the patient. As described above, in some embodiments, multiple patients may utilize the same gateway device 102 and one or more of the same sensors 112 in some embodiments. As such, in some embodiments, the gateway device 102 may already be paired with a particular sensor 112 and may store an association between the patient and that sensor 112.

Figure 5:
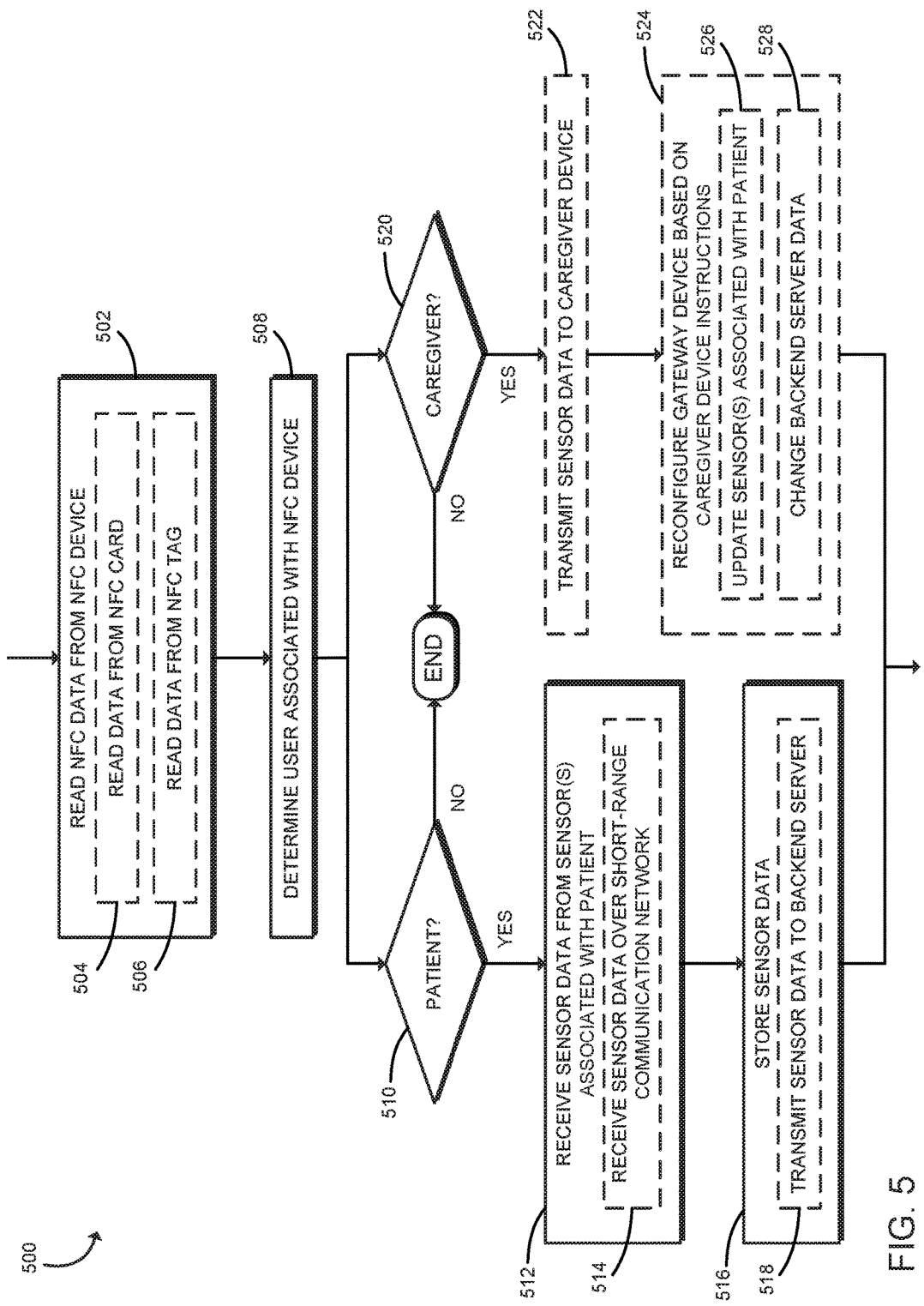
FIG. 5 is a simplified flow diagram of at least one embodiment of a method for management of patient healthcare.

Referring now to FIG. 5, in use, the gateway device 102 may execute a method 500 for management of patient healthcare. It should be appreciated that, in some embodiments, the techniques of the method 500 may be executed by one or more of the modules of the environment 300 of the gateway device 102 as shown in FIG. 3. The illustrative method 500 begins with block 402 in which the gateway device 102 reads NFC data from the NFC device 108. For example, the gateway device 102 may read NFC data from an NFC card 114 in block 504 or from an NFC tag 116 in block 506. As described above, the NFC data may identify the corresponding patient, the sensors 112 associated with the patient's remote healthcare plan, the backend server(s) 104 to which the gateway device 102 is to transmit sensor data regarding the patient's physiological characteristics and/or other contextual data, an API with which mobile computing devices 110 may interact with the gateway device 102, secure communication protocols, cryptographic keys, device attestation data, and/or other gateway configuration data suitable for performing various functions described herein. Accordingly, in block 508, the gateway device 102 determines the user associated with the NFC device 108 based on the NFC data.

If the gateway device 102 determines the user associated with the NFC device 108 is a patient in block 510, the gateway device 102 receives sensor data from the sensor(s) 112 associated with that patient in block 512. In doing so, in block 514, the gateway device 102 may receive the sensor data over a short-range communication network. In other words, in some embodiments, the patient may scan her NFC device 108 or otherwise communicate with the gateway device 102 via her NFC device 108 (e.g., by virtue of near proximity) and subsequently utilize the previously paired sensors 112 to collect any needed sensor data, which may be transmitted by the sensors 112 to the gateway device 102 over the short-range communication network. In block 516, the gateway device 102 temporarily or permanently stores the sensor data to the data storage 216 and/or the memory 214 of the gateway device 102. Further, in block 518, the gateway device 102 may transmit the sensor data to the associated backend server(s) 104 (e.g., the server(s) identified by the NFC data). It should be appreciated that, in some embodiments, the communication connection with the backend server 104 may be unavailable in which case the sensor data may be stored until the connection is restored or the sensor data is retrieved via an NFC card 114 or mobile computing device 110 of a caregiver.

If, however, the gateway device 102 determines the user associated with the NFC device 108 is a caregiver of the patient in block 520, the gateway device 102 may transmit sensor data stored in the data storage 216 and/or the memory 214 to the NFC device 108 of the caregiver in block 522. In block 524, the gateway device 102 may reconfigure the gateway device 102 based on device instructions provided by the caregiver's NFC device 108. In doing so, in block 526, the gateway device 102 may update the sensor(s) 112 associated with a particular patient based on the NFC data. For example, in some embodiments, a caregiver may modify the patient's remote healthcare plan to further require periodic body weight measurements. As such, the gateway device 102 may associate a weight scale with the patient. In block 528, the gateway device 102 may change data identifying one or more of the backend servers 104 associated with the gateway device 102. For example, the caregiver device instructions may indicate to transmit patient sensor data to a different backend server 104 than the backend server 104 previously used. It should be appreciated that the caregiver device instructions may vary depending on the particular embodiment. Further, as described above, in some embodiments, the caregiver may utilize a mobile computing device 110 to update/modify the gateway configuration.

EXAMPLES

Illustrative examples of the technologies disclosed herein are provided below. An embodiment of the technologies may include any one or more, and any combination of, the examples described below.

Example 1 includes a gateway device for management of patient healthcare, the gateway device comprising a communication module to read near field communication data from a near field communication device; a gateway administration module to (i) determine a user associated with the near field communication device based on the near field communication data, (ii) receive sensor data from one or more sensors communicatively coupled to the gateway device and associated with a patient in response to a determination that the user is the patient, and (iii) store the received sensor data to a data storage of the gateway device.

Example 2 includes the subject matter of Example 1, and wherein to store the received sensor data comprises to transmit the sensor data to a backend server.

Example 3 includes the subject matter of any of Examples 1 and 2, and wherein to receive the sensor data comprises to receive sensor data from a compute device that includes the one or more sensors.

Example 4 includes the subject matter of any of Examples 1-3, and wherein to receive the sensor data comprises to receive the sensor data from the compute device over a short-range communication network.

Example 5 includes the subject matter of any of Examples 1-4, and wherein the short-range communication network comprises a Bluetooth® communication network.

Example 6 includes the subject matter of any of Examples 1-5, and wherein the communication module is further to read other near field communication data from another near field communication device; wherein the gateway administration module is further to determine another user associated with the another near field communication device based on the other near field communication data; and wherein the communication module is further to transmit the sensor data to the another near field communication device in response to a determination that the another user is a caregiver of the patient.

Example 7 includes the subject matter of any of Examples 1-6, and wherein the gateway administration module is further to reconfigure the gateway device based on instructions received from the another near field communication device.

Example 8 includes the subject matter of any of Examples 1-7, and wherein to reconfigure the gateway device comprises to update the one or more sensors associated with the patient.

Example 9 includes the subject matter of any of Examples 1-8, and wherein to reconfigure the gateway device comprises to change a backend server associated with the gateway device.

Example 10 includes the subject matter of any of Examples 1-9, and wherein the gateway administration module is to determine a gateway configuration of the gateway device based on the near field communication data.

Example 11 includes the subject matter of any of Examples 1-10, and wherein to determine the gateway configuration comprises to determine the patient associated with the near field communication device.

Example 12 includes the subject matter of any of Examples 1-11, and wherein to determine the gateway configuration comprises to determine a corresponding backend server of the gateway device to which to transmit the sensor data.

Example 13 includes the subject matter of any of Examples 1-12, and wherein to determine the gateway configuration comprises to determine the one or more sensors associated with the patient.

Example 14 includes the subject matter of any of Examples 1-13, and wherein the gateway administration module is further to (i) select a sensor of the one or more sensors associated with the patient and (ii) pair the gateway device with the selected sensor.

Example 15 includes the subject matter of any of Examples 1-14, and wherein to pair the gateway device with the selected sensor comprises to pair the gateway device with a compute device that includes the selected sensor over a short-range communication network.

Example 16 includes the subject matter of any of Examples 1-15, and further including a feedback module to generate feedback indicative of a successful pairing of the gateway device with the selected sensor.

Example 17 includes the subject matter of any of Examples 1-16, and wherein to read the near field communication data comprises to read the near field communication data from a near field communication card.

Example 18 includes the subject matter of any of Examples 1-17, and wherein to read the near field communication data comprises to read the near field communication data from a near field communication tag.

Example 19 includes the subject matter of any of Examples 1-18, and wherein the gateway administration module is to determine whether the user is authorized to access a function of the gateway device based on a geographical location of the gateway device.

Example 20 includes a method for management of patient healthcare by a gateway device, the method comprising reading, by the gateway device, near field communication data from a near field communication device; determining, by the gateway device, a user associated with the near field communication device based on the near field communication data; receiving, by the gateway device, sensor data from one or more sensors communicatively coupled to the gateway device and associated with a patient in response to a determination that the user is the patient; and storing, by the gateway device, the received sensor data to a data storage of the gateway device.

Example 21 includes the subject matter of Example 20, and wherein storing the received sensor data comprises transmitting the sensor data to a backend server.

Example 22 includes the subject matter of any of Examples 20 and 21, and wherein receiving the sensor data comprises receiving sensor data from a compute device that includes the one or more sensors.

Example 23 includes the subject matter of any of Examples 20-22, and wherein receiving the sensor data comprises receiving the sensor data from the compute device over a short-range communication network.

Example 24 includes the subject matter of any of Examples 20-23, and wherein the short-range communication network comprises a Bluetooth® communication network.

Example 25 includes the subject matter of any of Examples 20-24, and further including reading, by the gateway device, other near field communication data from another near field communication device; determining, by the gateway device, another user associated with the another near field communication device based on the other near field communication data; and transmitting the sensor data to the another near field communication device in response to a determination that the another user is a caregiver of the patient.

Example 26 includes the subject matter of any of Examples 20-25, and further including reconfiguring the gateway device based on instructions received from the another near field communication device.

Example 27 includes the subject matter of any of Examples 20-26, and wherein reconfiguring the gateway device comprises updating the one or more sensors associated with the patient.

Example 28 includes the subject matter of any of Examples 20-27, and wherein reconfiguring the gateway device comprises changing a backend server associated with the gateway device.

Example 29 includes the subject matter of any of Examples 20-28, and further including determining a gateway configuration of the gateway device based on the near field communication data.

Example 30 includes the subject matter of any of Examples 20-29, and wherein determining the gateway configuration comprises determining the patient associated with the near field communication device.

Example 31 includes the subject matter of any of Examples 20-30, and wherein determining the gateway configuration comprises determining a corresponding backend server of the gateway device to which to transmit the sensor data.

Example 32 includes the subject matter of any of Examples 20-31, and wherein determining the gateway configuration comprises determining the one or more sensors associated with the patient.

Example 33 includes the subject matter of any of Examples 20-32, and further including selecting, by the gateway device, a sensor of the one or more sensors associated with the patient; and pairing the gateway device with the selected sensor.

Example 34 includes the subject matter of any of Examples 20-33, and wherein pairing the gateway device with the selected sensor comprises pairing the gateway device with a compute device that includes the selected sensor over a short-range communication network.

Example 35 includes the subject matter of any of Examples 20-34, and further including generating, by the gateway device, feedback indicative of a successful pairing of the gateway device with the selected sensor.

Example 36 includes the subject matter of any of Examples 20-35, and wherein reading the near field communication data comprises reading the near field communication data from a near field communication card.

Example 37 includes the subject matter of any of Examples 20-36, and wherein reading the near field communication data comprises reading the near field communication data from a near field communication tag.

Example 38 includes a computing device comprising a processor; and a memory having stored therein a plurality of instructions that when executed by the processor cause the computing device to perform the method of any of Examples 20-37.

Example 39 includes one or more machine-readable storage media comprising a plurality of instructions stored thereon that in response to being executed result in a computing device performing the method of any of Examples 20-37.

Example 40 includes a computing device comprising means for performing the method of any of Examples 20-37.

Example 41 includes a gateway device for management of patient healthcare, the gateway device comprising means for reading near field communication data from a near field communication device; means for determining a user associated with the near field communication device based on the near field communication data; means for receiving sensor data from one or more sensors communicatively coupled to the gateway device and associated with a patient in response to a determination that the user is the patient; and means for storing the received sensor data to a data storage of the gateway device.

Example 42 includes the subject matter of Example 41, and wherein the means for storing the received sensor data comprises means for transmitting the sensor data to a backend server.

Example 43 includes the subject matter of any of Examples 41 and 42, and wherein the means for receiving the sensor data comprises means for receiving sensor data from a compute device that includes the one or more sensors.

Example 44 includes the subject matter of any of Examples 41-43, and wherein the means for receiving the sensor data comprises means for receiving the sensor data from the compute device over a short-range communication network.

Example 45 includes the subject matter of any of Examples 41-44, and wherein the short-range communication network comprises a Bluetooth® communication network.

Example 46 includes the subject matter of any of Examples 41-45, and further including means for reading other near field communication data from another near field communication device; means for determining another user associated with the another near field communication device based on the other near field communication data; and means for transmitting the sensor data to the another near field communication device in response to a determination that the another user is a caregiver of the patient.

Example 47 includes the subject matter of any of Examples 41-46, and further including means for reconfiguring the gateway device based on instructions received from the another near field communication device.

Example 48 includes the subject matter of any of Examples 41-47, and wherein the means for reconfiguring the gateway device comprises means for updating the one or more sensors associated with the patient.

Example 49 includes the subject matter of any of Examples 41-48, and wherein the means for reconfiguring the gateway device comprises means for changing a backend server associated with the gateway device.

Example 50 includes the subject matter of any of Examples 41-49, and further including means for determining a gateway configuration of the gateway device based on the near field communication data.

Example 51 includes the subject matter of any of Examples 41-50, and wherein the means for determining the gateway configuration comprises means for determining the patient associated with the near field communication device.

Example 52 includes the subject matter of any of Examples 41-51, and wherein the means for determining the gateway configuration comprises means for determining a corresponding backend server of the gateway device to which to transmit the sensor data.

Example 53 includes the subject matter of any of Examples 41-52, and wherein the means for determining the gateway configuration comprises means for determining the one or more sensors associated with the patient.

Example 54 includes the subject matter of any of Examples 41-53, and further including means for selecting a sensor of the one or more sensors associated with the patient; and means for pairing the gateway device with the selected sensor.

Example 55 includes the subject matter of any of Examples 41-54, and wherein the means for pairing the gateway device with the selected sensor comprises means for pairing the gateway device with a compute device that includes the selected sensor over a short-range communication network.

Example 56 includes the subject matter of any of Examples 41-55, and further including means for generating feedback indicative of a successful pairing of the gateway device with the selected sensor.

Example 57 includes the subject matter of any of Examples 41-56, and wherein the means for reading the near field communication data comprises means for reading the near field communication data from a near field communication card.

Example 58 includes the subject matter of any of Examples 41-57, and wherein the means for reading the near field communication data comprises means for reading the near field communication data from a near field communication tag.

The invention claimed is:

1. A gateway device for management of patient healthcare, the gateway device comprising:
 a communication module to read first near field communication data from a first near field communication device and second near field communication data from a second near field communication device different from the first near field communication device;
 a gateway administration module to (i) determine a first user associated with the first near field communication device based on the first near field communication data, (ii) determine a second user associated with the second near field communication device based on the second near field communication data, (iii) obtain sensor data from one or more sensors communicatively coupled to the gateway device and associated with a patient in response to a determination that the first user is the patient, and (iv) store the obtained sensor data to a data storage of the gateway device; and
 wherein the communication module is further to transmit the sensor data to the second near field communication device in response to a determination that the second user is a caregiver of the patient.

2. The gateway device of claim 1, wherein to store the obtained sensor data comprises to transmit the sensor data to a backend server.

3. The gateway device of claim 1, wherein to obtain the sensor data comprises to obtain sensor data from a compute device that includes the one or more sensors.

4. The gateway device of claim 1, wherein to obtain the sensor data comprises to obtain the sensor data from the compute device over a short-range communication network.

5. The gateway device of claim 4, wherein the short-range communication network comprises a Bluetooth® communication network.

6. The gateway device of claim 1, wherein the gateway administration module is further to reconfigure the gateway device based on instructions obtained from the second near field communication device.

7. The gateway device of claim 6, wherein to reconfigure the gateway device comprises to update the one or more sensors associated with the patient.

8. The gateway device of claim 6, wherein to reconfigure the gateway device comprises to change a backend server associated with the gateway device.

9. The gateway device of claim 1, wherein the gateway administration module is configured to determine a gateway configuration of the gateway device based on the first near field communication data.

10. The gateway device of claim 9, wherein to determine the gateway configuration comprises to determine the patient associated with the first near field communication device.

11. The gateway device of claim 9, wherein to determine the gateway configuration comprises to determine a corresponding backend server of the gateway device to which to transmit the sensor data.

12. The gateway device of claim 9, wherein to determine the gateway configuration comprises to determine the one or more sensors associated with the patient.

13. The gateway device of claim 9, wherein the gateway administration module is further to (i) select a sensor of the one or more sensors associated with the patient and (ii) pair the gateway device with the selected sensor.

14. The gateway device of claim 13, wherein to pair the gateway device with the selected sensor comprises to pair the gateway device with a compute device that includes the selected sensor over a short-range communication network.

15. The gateway device of claim 1, wherein to read the first near field communication data comprises to read the first near field communication data from one of a near field communication card or a near field communication tag.

16. One or more non-transitory machine-readable storage media comprising a plurality of instructions stored thereon that, in response to execution by a gateway device, causes the gateway device to: read first near field communication data from a first near field communication device; read second near field communication data from a second near field communication device different from the first near field communication device; determine a first user associated with the first near field communication device based on the first near field communication data; determine a second user associated with the second near field communication device based on the second near field communication data; obtain sensor data from one or more sensors communicatively coupled to the gateway device and associated with a patient in response to a determination that the first user is the patient; store the obtained sensor data to a data storage of the gateway device; and transmit the sensor data to the second near field communication device in response to a determination that the second user is a caregiver of the patient.

17. The one or more machine-readable storage media of claim 16, wherein the plurality of instructions further causes the gateway device to reconfigure the gateway device based on instructions obtained from the second near field communication device.

18. The one or more machine-readable storage media of claim 17, wherein to reconfigure the gateway device comprises to at least one of update the one or more sensors associated with the patient or change a backend server associated with the gateway device.

19. A method for management of patient healthcare by a gateway device, the method comprising:
 reading, by the gateway device, first near field communication data from a first near field communication device;
 reading, by the gateway device, second near field communication data from a second near field communication device different from the first near field communication device;
 determining, by the gateway device, a first user associated with the first near field communication device based on the first near field communication data;
 determining, by the gateway device, a second user associated with the second near field communication device based on the second near field communication data;
 obtaining, by the gateway device, sensor data from one or more sensors communicatively coupled to the gateway device and associated with a patient in response to a determination that the first user is the patient;
 storing, by the gateway device, the obtained sensor data to a data storage of the gateway device; and transmitting, by the gateway device, the sensor data to the second near field communication device in response to a determination that the second user is a caregiver of the patient.

20. The method of claim 19, further comprising determining a gateway configuration of the gateway device based on the near field communication data.

21. The method of claim 20, wherein determining the gateway configuration comprises at least one of:
determining the patient associated with the first near field communication device;
determining a corresponding backend server of the gateway device to which to transmit the sensor data; or
determining the gateway configuration comprises determining the one or more sensors associated with the patient.

22. The method of claim 20, further comprising:
selecting, by the gateway device, a sensor of the one or more sensors associated with the patient; and
pairing the gateway device with the selected sensor.

23. The method of claim 19, wherein reading the first near field communication data comprises reading the first near field communication data from one of a near field communication card or a near field communication tag.

* * * * *